US012743991B2

(12) United States Patent
Kim et al.

(10) Patent No.: US 12,743,991 B2
(45) Date of Patent: Sep. 22, 2026

(54) DISPLAY DEVICE

(71) Applicant: DB GlobalChip Co., Ltd., Seongnam-si (KR)

(72) Inventors: Kyung Hwan Kim, Seongnam-si (KR); Sung Tak Yoon, Seongnam-si (KR); Shin Yoon, Seongnam-si (KR); Chang Hee Shin, Seongnam-si (KR)

(73) Assignee: DB GlobalChip Co., Ltd., Seongnam-si (KR)

( * ) Notice: Subject to any disclaimer, the term of this patent is extended or adjusted under 35 U.S.C. 154(b) by 0 days.

(21) Appl. No.: 19/008,028

(22) Filed: Jan. 2, 2025

(65) Prior Publication Data

US 2025/0225921 A1 Jul. 10, 2025

(30) Foreign Application Priority Data

Jan. 8, 2024 (KR) ........................ 10-2024-0002881

(51) Int. Cl.
*G09G 3/32* (2016.01)
*G09G 3/20* (2006.01)

(52) U.S. Cl.
CPC ............. *G09G 3/32* (2013.01); *G09G 3/2007* (2013.01); *G09G 2300/0804* (2013.01)

(58) Field of Classification Search
CPC .............................................. G09G 2300/0809
See application file for complete search history.

(56) References Cited

U.S. PATENT DOCUMENTS

2002/0135424 A1* 9/2002 Oikawa ................... H03M 1/50 330/288
2004/0217934 A1* 11/2004 Yang .................... G09G 3/3283 345/100
2005/0057189 A1* 3/2005 Kimura ................ G09G 3/3233 315/291
2013/0020467 A1* 1/2013 Johnson ............... H04N 25/677 257/E27.059
2013/0069536 A1* 3/2013 Ni ........................ H05B 45/397 315/122
2013/0334979 A1* 12/2013 Nathan .................. H05B 45/60 315/240
2015/0326804 A1* 11/2015 Lee ........................ H04N 25/78 348/308
2020/0184888 A1* 6/2020 Brownlow ........... G09G 3/3266
2022/0417461 A1* 12/2022 Kato ...................... H04N 25/60
2023/0005419 A1* 1/2023 Lee .......................... G09G 3/32

FOREIGN PATENT DOCUMENTS

KR 10-0173942 B1 4/1999
KR 10-1942466 B1 4/2019
KR 10-2060749 B1 12/2019
KR 10-2023-0038261 A 3/2023

* cited by examiner

*Primary Examiner* — Bipin Gyawali

(74) *Attorney, Agent, or Firm* — Knobbe, Martens, Olson & Bear, LLP

(57) ABSTRACT

A display device is proposed. The display device may include a pixel array including n pixel groups, and a reference current source connected to the pixel array and providing a reference current. The display device may also include n sub-current sources and n pixel circuits included in each of the n pixel groups and connected to the reference current source. Each of the n sub-current sources may provide a first mirrored current that mirrors the reference current. Each of the n pixel circuits may provide a second mirrored current that mirrors the first mirrored current, and wherein n is a natural number.

25 Claims, 6 Drawing Sheets

DISPLAY DEVICE

CROSS-REFERENCE TO RELATED APPLICATION

This application claims priority under 35 U.S.C § 119 to Korean Patent Application No. 10-2024-0002881 filed on Jan. 8, 2024, in the Korean Intellectual Property Office, the entire contents of which are hereby incorporated by reference. This application also relates to U.S. patent application Ser. No. 19/004,896 filed on Dec. 30, 2024, which is hereby incorporated by reference in its entirety.

BACKGROUND

Technical Field

The present disclosure relates to a display device, specifically a display device comprising a pixel array including a group of pixels.

Description of Related Technology

The contents described in this section are merely provided as background information for the present embodiment and do not constitute prior art.

Recently, the use of LEDOS has been increasing, and interest in implementing LEDoS technology has grown accordingly.

SUMMARY

One aspect is a display device that groups a plurality of pixels in a pixel array and supplies each pixel group with a current mirrored from a reference current.

Another aspect is a display device that includes a sub-current source in each pixel group to supply a current mirrored from a reference current.

The aspects of the present disclosure are not limited to those disclosed herein. Other aspects and advantages of the present disclosure not explicitly stated can be understood from the following description and will become more apparent through embodiments of the present disclosure. Furthermore, it will be easily understood that the aspects and advantages of the present disclosure can be realized through the means and combinations thereof described in the claims.

Another aspect is a display device that comprises, a pixel array including n pixel groups, a reference current source connected to the pixel array and providing a reference current, and n sub-current sources and n pixel circuits included in each of the n pixel groups and connected to the reference current source, wherein each of the n sub-current sources provides a first mirrored current that mirrors the reference current, wherein each of the n pixel circuits provides a second mirrored current that mirrors the first mirrored current, and wherein n is a natural number.

According to some aspects, each of the n pixel groups includes a plurality of light-emitting elements, and the plurality of light-emitting elements in each of the n pixel groups are connected to each of the n pixel circuits.

According to some aspects, the second mirrored current is provided to each of the plurality of light-emitting elements.

According to some aspects, a first pixel group among the n pixel groups includes a first sub-current source among the n sub-current sources and a first pixel circuit among the n pixel circuits, wherein the first sub-current source includes, a first transistor connected to the reference current source and providing the first mirrored current, and a second transistor connected to one terminal of the first transistor, and wherein the first pixel circuit includes, a plurality of third transistors connected to the second transistor and providing the second mirrored current.

According to some aspects, the first pixel group includes a plurality of light-emitting elements, each connected to one of the plurality of third transistors and receiving the second mirrored current.

According to some aspects, the first transistor includes a plurality of first sub-transistors connected in series, wherein the second transistor includes a plurality of second sub-transistors connected in series, and wherein each of the plurality of third transistors includes a plurality of third sub-transistors connected in series.

According to some aspects, the first pixel group includes a plurality of light-emitting elements, each connected to one of the plurality of third transistors and receiving the second mirrored current, and wherein a first light-emitting element among the plurality of light-emitting elements is connected to the plurality of third sub-transistors and receives the second mirrored current.

According to some aspects, the first transistor is an NMOS transistor, and wherein the second transistor and the plurality of third transistors are PMOS transistors.

According to some aspects, the first transistor is a PMOS transistor, and wherein the second transistor and the plurality of third transistors are NMOS transistors.

Another aspect is a display device that comprises, a first pixel circuit connected to a first light-emitting element group, a first sub-current source connected to the first pixel circuit, a second pixel circuit connected to a second light-emitting element group; a second sub-current source connected to the second pixel circuit; and a reference current source connected to each of the first sub-current source and the second sub-current source and providing a reference current, wherein each of the first sub-current source and the second sub-current source provides a first mirrored current that mirrors the reference current, and wherein each of the first pixel circuit and the second pixel circuit provides a second mirrored current that mirrors the first mirrored current.

According to some aspects, each of the first light-emitting element group and the second light-emitting element group includes a plurality of light-emitting elements.

According to some aspects, the second mirrored current is provided to each of the plurality of light-emitting elements.

According to some aspects, each of the first sub-current source and the second sub-current source includes, a first transistor connected to the reference current source and providing the first mirrored current, and a second transistor connected to one terminal of the first transistor, and wherein each of the first pixel circuit and the second pixel circuit includes, a plurality of third transistors connected to the second transistor and providing the second mirrored current.

According to some aspects, each of the first light-emitting element group and the second light-emitting element group includes a plurality of light-emitting elements, each connected to one of the plurality of third transistors and receiving the second mirrored current.

According to some aspects, the first transistor includes a plurality of first sub-transistors connected in series, wherein the second transistor includes a plurality of second sub-transistors connected in series, and wherein each of the plurality of third transistors includes a plurality of third sub-transistors connected in series.

According to some aspects, each of the first light-emitting element group and the second light-emitting element group includes a plurality of light-emitting elements, each connected to one of the plurality of third transistors and receiving the second mirrored current, and wherein a first light-emitting element among the plurality of light-emitting elements is connected to the plurality of third sub-transistors and receives the second mirrored current.

According to some aspects, the first transistor is an NMOS transistor, and wherein the second transistor and the plurality of third transistors are PMOS transistors.

According to some aspects, the first transistor is a PMOS transistor, and wherein the second transistor and the plurality of third transistors are NMOS transistors.

Another aspect is a display device that comprises, a pixel array including n pixel groups; a reference current source connected to the pixel array and providing a reference current, n sub-current sources included in each of the n pixel groups and connected to the reference current source, and n pixel circuits included in each of the n pixel groups and connected to the n sub-current sources, wherein each of the n sub-current sources includes, a first transistor that forms a first current mirror with a reference transistor of the reference current source, and wherein each of the n sub-current sources and each of the n pixel circuits includes a second current mirror connected to the first transistor.

According to some aspects, the second current mirror includes: a second transistor connected to one terminal of the first transistor; and a plurality of third transistors connected to the second transistor.

According to some aspects, each of the n pixel groups includes a plurality of light-emitting elements, each connected to one of the plurality of third transistors.

According to some aspects, the first transistor includes a plurality of first sub-transistors connected in series, wherein the second transistor includes a plurality of second sub-transistors connected in series, and wherein each of the plurality of third transistors includes a plurality of third sub-transistors connected in series.

According to some aspects, the first transistor is an NMOS transistor, and wherein the second transistor and the plurality of third transistors are PMOS transistors.

According to some aspects, the first transistor is a PMOS transistor, and wherein the second transistor and the plurality of third transistors are NMOS transistors.

According to some aspects, the first mirrored current, mirrored from the reference current by the first current mirror, is provided to the first transistor and the second current mirror, and wherein the second mirrored current, mirrored from the first mirrored current by the second current mirror, is generated.

According to some aspects, each of the n pixel groups includes a plurality of light-emitting elements, wherein the plurality of light-emitting elements in each of the n pixel groups are connected to the second current mirror, and wherein the second mirrored current is provided to the plurality of light-emitting elements.

The display device of the present disclosure may group a plurality of pixels in a pixel array and mirror the reference current for a pixel group that includes the plurality of pixels, instead of mirroring (that is, copying) the reference current for each of the plurality of individual pixels, thereby providing a mirrored current to the light-emitting elements with minimized error from the reference current.

Additionally, the display device of the present disclosure may include a sub-current source in each pixel group, thereby reducing the number of instances where the reference current is mirrored. This may minimize the error between the current supplied to each of the plurality of pixels and the reference current.

Along with the aforementioned content, the specific effects of the present disclosure will be described in conjunction with the explanation of specific aspects for implementing the invention below.

DETAILED DESCRIPTION

Figure 1:
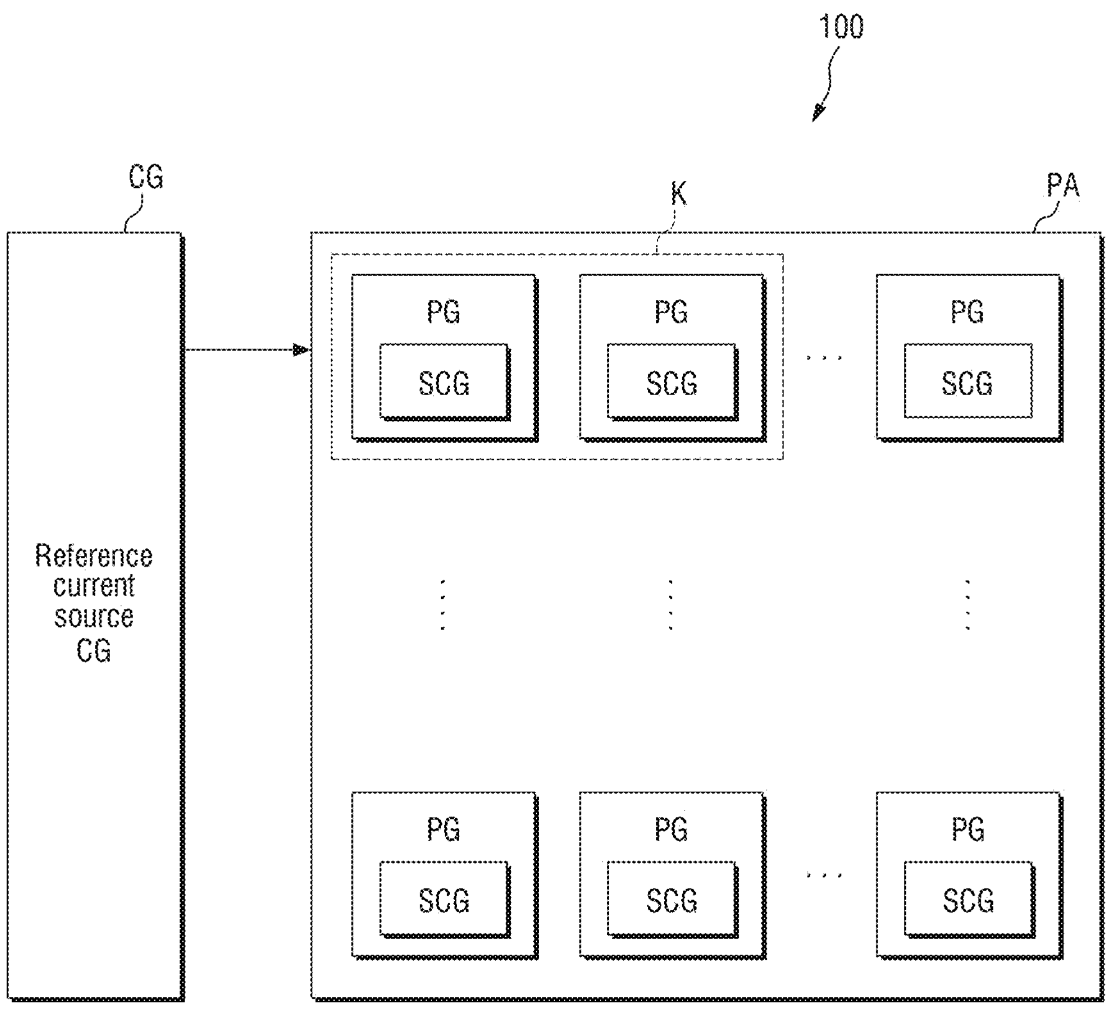
FIG. 1 is a diagram illustrating a display device according to an embodiment of the present disclosure.

To implement LEDoS technology, a current source is required to control the light emission of each of the plurality of pixels included in LEDoS. Micro LEDs, which may be included in LEDOS, can have an issue where their grayscale fluctuates depending on variations in current. To address this issue, it is necessary to ensure that the current amount generated by the current source for each of the plurality of pixels is consistent.

When current amount fluctuations occur, voltage drops arise, leading to problems. Therefore, there has been a demand for technology that ensures the current supplied to each of the plurality of pixels included in LEDOS is identical to the current from the current source.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Below, the display device according to the embodiments of the present disclosure will be described with reference to FIGS. 1 to 6.

FIG. 1 is a diagram illustrating a display device according to an embodiment of the present disclosure.

Referring to FIG. 1, the display device 100 according to an embodiment of the present disclosure may include a reference current source CG and a pixel array PA.

In addition to what is shown in the diagram, the display device 100 may further include a clock generator for providing a clock signal to the pixel array PA and a data driver for providing data.

The reference current source CG may be connected to the pixel array PA to supply the reference current to each of the n pixel groups PG.

The pixel array PA may include n pixel groups PG, where n is a natural number. The pixel array PA may also include n sub-current sources SCG and n pixel circuits PXC. Each of the n pixel groups PG may include a sub-current source SCG. The sub-current source SCG may be connected to the reference current source.

Each of the n pixel groups PG may include a plurality of pixels. A pixel may include, for example, a transistor and a light-emitting element. Each of the n pixel groups PG may include a plurality of light-emitting elements.

The plurality of light-emitting elements may be provided on a substrate separate from the driving circuit substrate on which the reference current source CG and the n sub-current sources SCG are arranged. For example, a light-emitting element array may be provided separately from the driving circuit substrate. The light-emitting element array may include a plurality of light-emitting elements. A certain number of one or more light-emitting elements from the plurality of light-emitting elements may be grouped to form a pixel group PG. The plurality of light-emitting elements included in each of the n pixel groups PG may be connected to each of the n sub-current sources SCG.

In some embodiments of the present disclosure, the display device 100 may include one sub-current source SCG for each pixel group PG, which groups a plurality of pixels, instead of including one sub-current source for each pixel.

Figure 2:
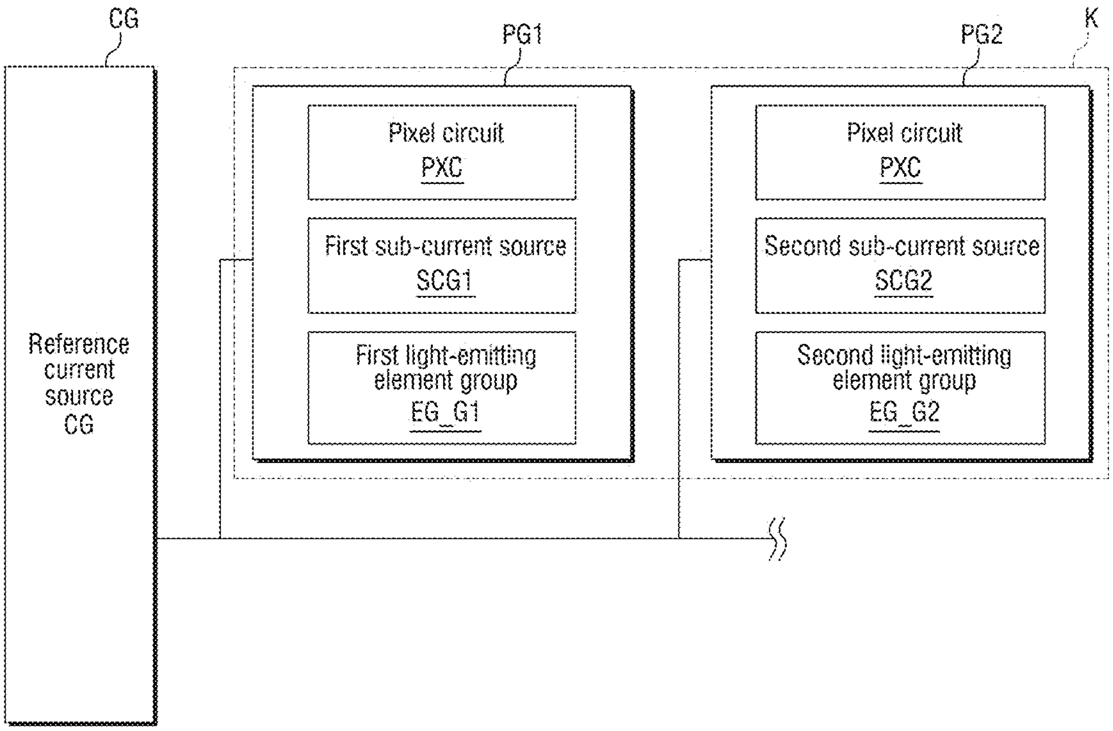
FIG. 2 is an enlarged view of area K in FIG. 1.

FIG. 2 is an enlarged view of area K in FIG. 1.

Referring to FIGS. 1 and 2, the n pixel groups PG may include a first pixel group PG1 and a second pixel group PG2. Each of the n pixel groups PG may have the same structure.

The first pixel group PG1 may include a first sub-current source SCG1, a pixel circuit PXC, and a first light-emitting element group ED_G1. The first light-emitting element group ED_G1 may be provided on a substrate separate from the substrate on which the first sub-current source SCG1 is arranged. The first light-emitting element group ED_G1 may include a plurality of light-emitting elements. The first sub-current source SCG1, the pixel circuit PXC, and the first light-emitting element group ED_G1 may be electrically connected to each other. The first sub-current source SCG1 may also be electrically connected to the reference current source CG.

The second pixel group PG2 may include a second sub-current source SCG2, a pixel circuit PXC, and a second light-emitting element group ED_G2. The second light-emitting element group ED_G2 may be provided on a substrate separate from the substrate on which the second sub-current source SCG2 is arranged. The second light-emitting element group ED_G2 may include a plurality of light-emitting elements. The second sub-current source SCG2, the pixel circuit PXC, and the second light-emitting element group ED_G2 may be electrically connected to each other. The second sub-current source SCG2 may also be electrically connected to the reference current source CG.

Figure 3:
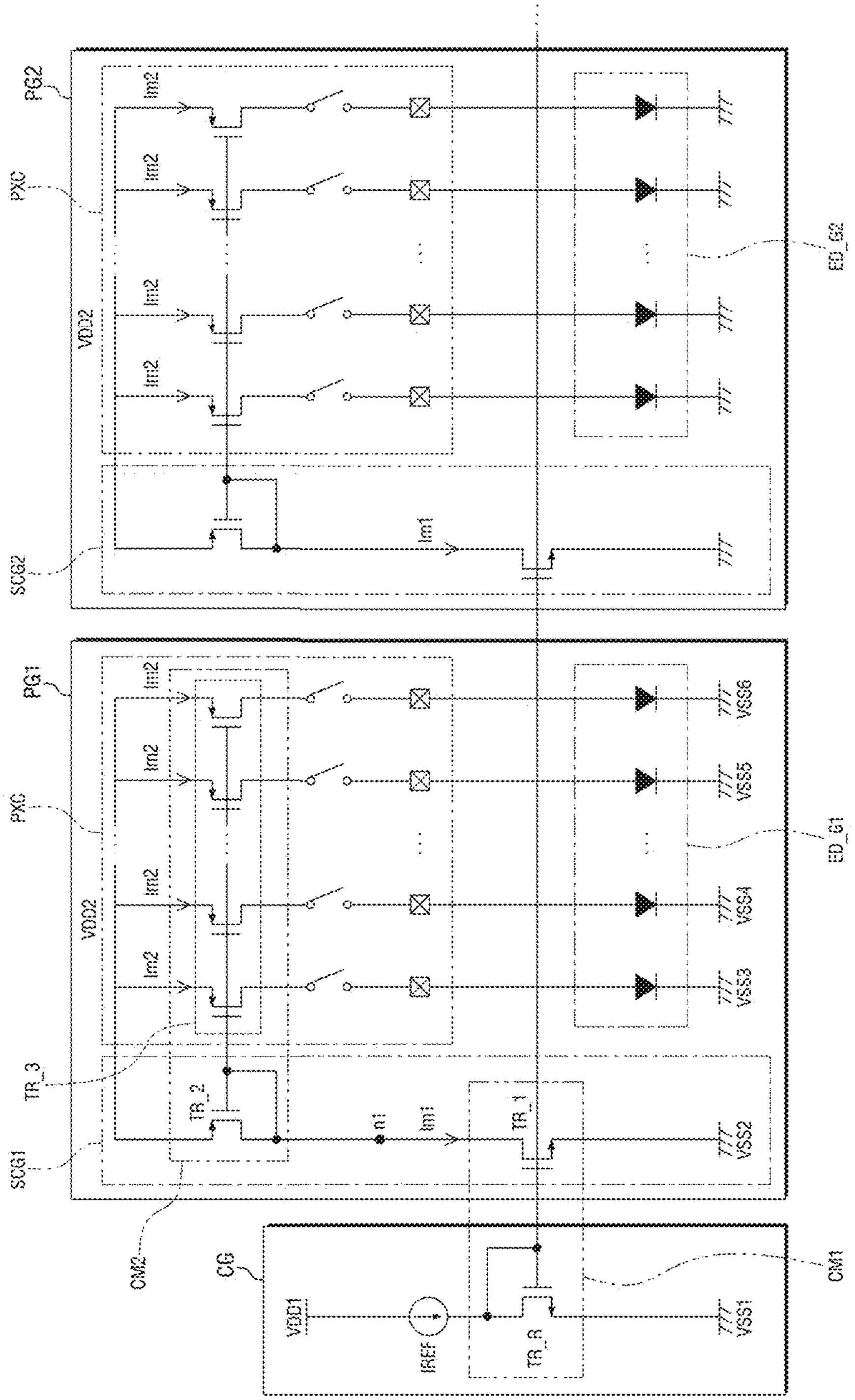
FIG. 3 is a diagram illustrating a display device according to some embodiments of the present disclosure, corresponding to the circuit diagram of FIG. 2.

FIG. 3 is a diagram illustrating a display device according to some embodiments of the present disclosure, corresponding to the circuit diagram of FIG. 2. The description of the first pixel group PG1 may be applied to the second pixel group PG2.

Referring to FIGS. 1, 2, and 3, each of the n sub-current sources SCG may provide a first mirrored current Im1, and each of the n pixel circuits PXC may provide a second mirrored current Im2. The first mirrored current Im1 may be a current mirrored from the reference current IREF. The second mirrored current Im2 may be a current mirrored from the first mirrored current Im1. The reference current IREF, the first mirrored current Im1, and the second mirrored current Im2 may be currents having substantially the same current amount within an error range.

The second mirrored current Im2 may be supplied to each of the plurality of light-emitting elements included in each of the n pixel groups PG.

The reference current source CG may include a reference transistor TR_R, one terminal of which is connected to the first power supply VDD1 and the other terminal is connected to the first common power supply VSS1. The reference transistor TR_R may form a first current mirror CM1 with the first transistor TR_1 included in each of the n sub-current sources SCG.

Each of the n sub-current sources SCG may include a first transistor TR_1. The first transistor TR_1 may be connected to the reference current source CG and provide a first mirrored current Im1 that mirrors the reference current IREF. One terminal of the first transistor TR_1 may be connected to the first node n1, and the other terminal of the first transistor TR_1 may be connected to the second common power supply VSS2.

For example, the first sub-current source SCG1 of the first pixel group PG1 may include the first transistor TR_1 that forms the first current mirror CM1 with the reference transistor TR_R. The first current mirror CM1 may generate the first mirrored current Im1 by mirroring the reference current IREF.

Each of the n sub-current sources SCG may include a second transistor TR_2. Each of the n sub-current sources SCG may also include a second current mirror CM2, which is connected to the first transistor TR_1. One terminal of the second transistor TR_2 may be connected to the second power supply VDD2, and the other terminal may be connected to the first node n1, which in turn is connected to one terminal of the first transistor TR_1. The first mirrored current Im1 may flow through the second transistor TR_2.

Each of the n pixel circuits PXC may include a plurality of third transistors TR_3. The plurality of third transistors TR_3 may be connected to the second transistor TR_2 and provide a second mirrored current Im2 that mirrors the first mirrored current Im1. One terminal of each of the plurality of third transistors TR_3 may be connected to the second power supply VDD2, and the other terminal of the plurality of third transistors TR_3 may be connected to the light-emitting element group included in each of the n sub-current sources SCG. The second mirrored current Im2 may be supplied to each of the plurality of light-emitting elements in the light-emitting element group. Each of the plurality of light-emitting elements in the light-emitting element group of a pixel group may be connected to each of the plurality of third transistors TR_3.

For example, the first sub-current source SCG1 and the pixel circuit PXC of the first pixel group PG1 may include a second current mirror CM2 connected to the first transistor TR_1. The second current mirror CM2 may include the second transistor TR_2, which is connected to one terminal of the first transistor TR_1, and a plurality of third transistors TR_3, which are connected to the second transistor TR_2. The second current mirror CM2 may form the second mirrored current Im2 by mirroring the first mirrored current Im1. The second mirrored current Im2 may be supplied to each of the plurality of light-emitting elements included in the first light-emitting element group ED_G1.

In some embodiments, the reference transistor TR_R and the first transistor TR_1 may be NMOS transistors, while the second transistor TR_2 and the plurality of third transistors TR_3 may be PMOS transistors.

One third transistor TR_3 and one light-emitting element may form one pixel. Each of the n pixel groups PG may include a plurality of pixels and one sub-current source.

The first power supply VDD1 and the second power supply VDD2 may have the same power supply voltage. The first common power supply VSS1 through the sixth common power supply VSS6 may differ from one another. The first common power supply VSS1 may be a ground voltage connected to the reference transistor TR_R. The second common power supply VSS2 may be a ground voltage connected to the first transistor TR_1. Each of the third through sixth common power supplies VSS3 through VSS6 may be ground voltages connected to each of the plurality of light-emitting elements included in the first light-emitting element group ED_G1. Each of the first common power supply VSS1 through the sixth common power supply VSS6 may be interconnected via metal, and resistance may arise from the connecting metal.

When the first common power supply VSS1 through the sixth common power supply VSS6 differ from one another, mirroring the reference current IREF for each pixel may result in voltage drops caused by resistance, leading to a reduction in the amount of the current supplied to the light-emitting elements. However, the display device 100 according to the embodiments of the present disclosure may supply a mirrored current Im2 substantially identical to the reference current IREF to each of the plurality of light-emitting elements by using two current mirrors CM1 and CM2, even when the first common power supply VSS1 through the sixth common power supply VSS6 differ from one another while the same power supplies VDD1 and VDD2 are applied. This reduces the impact of resistance, even when the common power supplies VSS1 through VSS6 are different.

The display device 100 according to some embodiments of the present disclosure, instead of including a sub-current source for each pixel, arranges one sub-current source SCG for each pixel group PG, which groups a plurality of pixels. This reduces the number of times the reference current IREF is mirrored for the pixel array PA in FIG. 1, thereby reducing the error between the reference current IREF and the mirrored current.

The display device 100 according to some embodiments of the present disclosure includes not only a first current mirror CM1 for mirroring the reference current IREF but also a second current mirror CM2 for mirroring the first mirrored current Im1. This reduces the spacing between the second transistor and the third transistor used for mirroring, thereby decreasing the error between the first mirrored current Im1 and the second mirrored current Im2.

Figure 4:
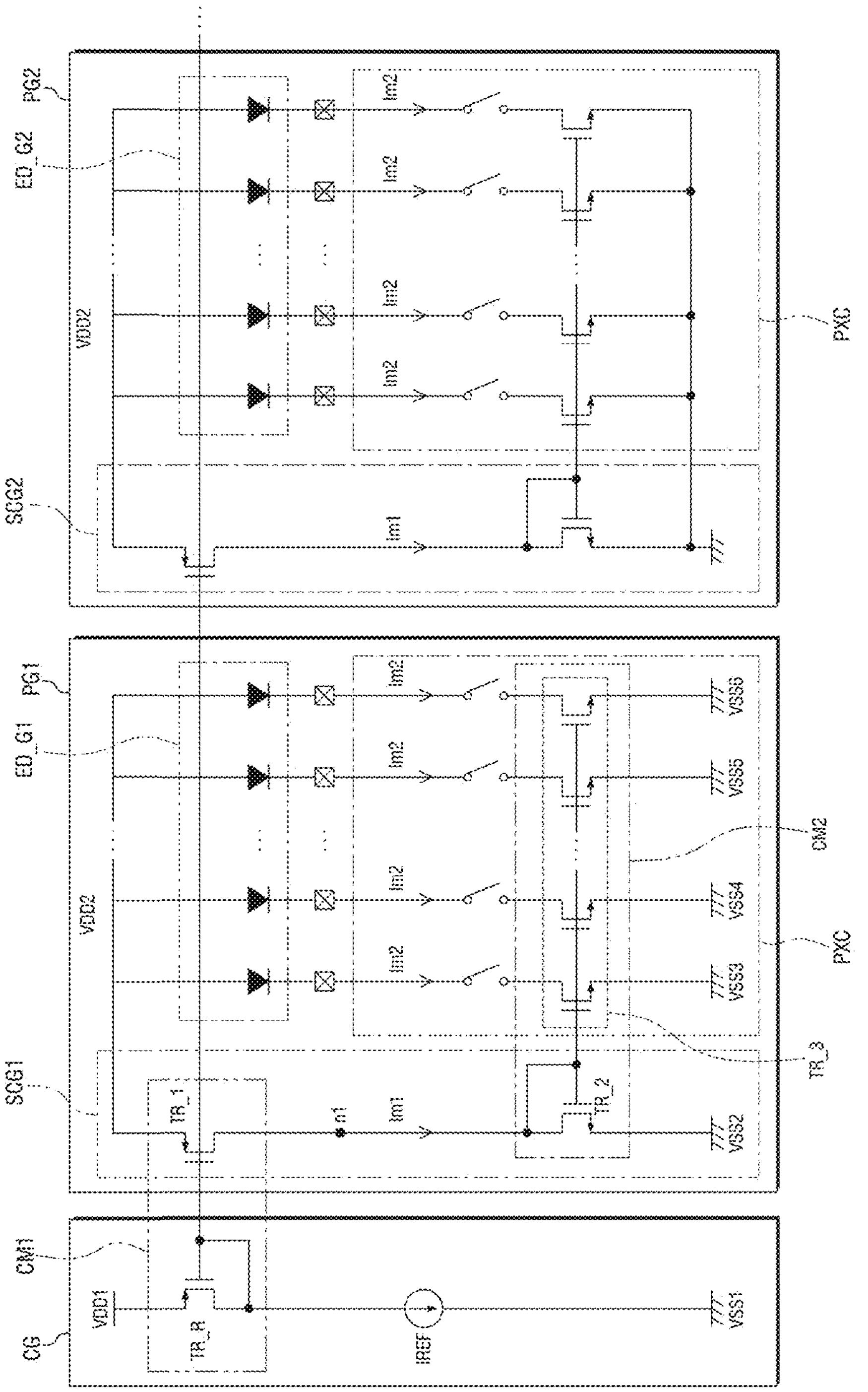
FIG. 4 is a diagram illustrating a display device according to some embodiments of the present disclosure, corresponding to the circuit diagram of FIG. 2.

FIG. 4 is a diagram illustrating a display device according to some embodiments of the present disclosure, corresponding to the circuit diagram of FIG. 2. For clarity of explanation, overlapping content with the descriptions in FIGS. 1 through 3 is simplified or omitted.

Referring to FIGS. 1, 2, and 4, the reference transistor TR_R included in the reference current source CG may be a PMOS transistor.

One terminal of the first transistor TR_1 may be connected to the second power supply VDD2, and the other terminal of the first transistor TR_1 may be connected to the first node n1. The first transistor TR_1 may be a PMOS transistor.

One terminal of the second transistor TR_2 may be connected to the other terminal of the first transistor TR_1 through the first node n1, and the other terminal of the second transistor TR_2 may be connected to the second common power supply VSS2. The second transistor TR_2 may be an NMOS transistor.

One terminal of each of the plurality of third transistors TR_3 may be connected to the light-emitting element group included in each of the n sub-current sources SCG, and the other terminal of each of the plurality of third transistors TR_3 may be connected to the third common power supply VSS3 through the sixth common power supply VSS6. Each of the plurality of third transistors TR_3 may be an NMOS transistor.

Figure 5:
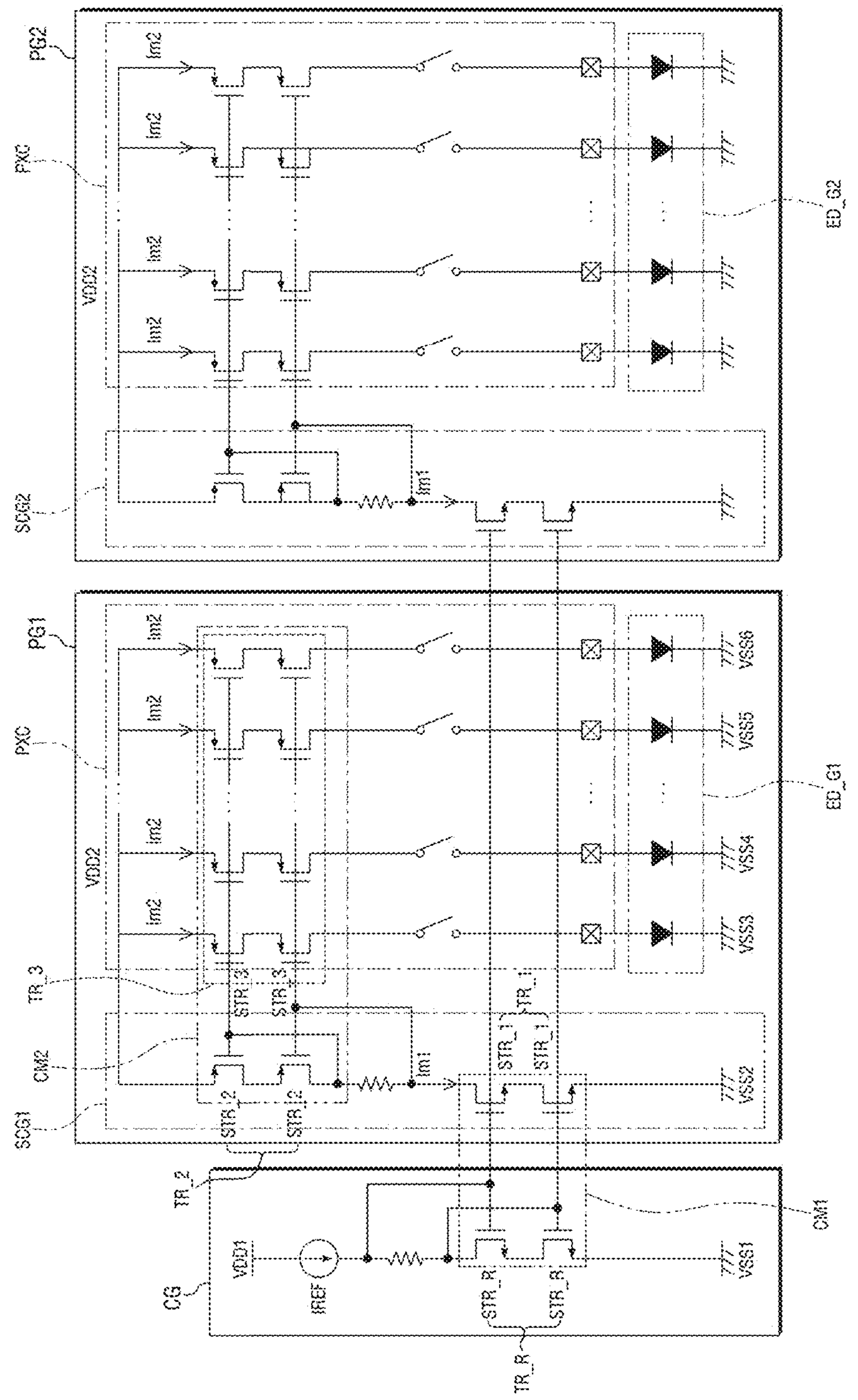
FIG. 5 is a diagram illustrating a display device according to some embodiments of the present disclosure, corresponding to the circuit diagram of FIG. 2.

FIG. 5 is a diagram illustrating a display device according to some embodiments of the present disclosure, corresponding to the circuit diagram of FIG. 2. For clarity of explanation, overlapping content with the descriptions in FIGS. 1 through 3 is simplified or omitted.

Referring to FIGS. 1, 2, and 5, the first transistor TR_1 included in each of the n pixel groups PG may include a plurality of first sub-transistors STR_1 connected in series. Each of the plurality of first sub-transistors STR_1 may be an NMOS transistor.

The reference transistor TR_R may include a plurality of reference sub-transistors STR_R connected in series. Each of the plurality of reference sub-transistors STR_R may be an NMOS transistor.

The plurality of reference sub-transistors STR_R and the plurality of first sub-transistors STR_1 may form the first current mirror CM1 together.

Each second transistor TR_2 included in the n pixel groups PG may include a plurality of second sub-transistors STR_2 connected in series. Each of the plurality of second sub-transistors STR_2 may be a PMOS transistor.

Each of the plurality of third transistors TR_3 included in each of the n pixel circuits PXC may include a plurality of third sub-transistors STR_3 connected in series. A single pixel may include a plurality of third sub-transistors STR_3. The plurality of third sub-transistors STR_3 included in each of the plurality of pixels may be interconnected. Each of the plurality of third sub-transistors STR_3 may be a PMOS transistor.

Each of the n pixel groups PG may include a plurality of light-emitting elements that receive the second mirrored current Im2 from each of the plurality of third transistors TR_3. A single light-emitting element in a pixel may receive the second mirrored current Im2 from the plurality of third sub-transistors STR_3.

Figure 6:
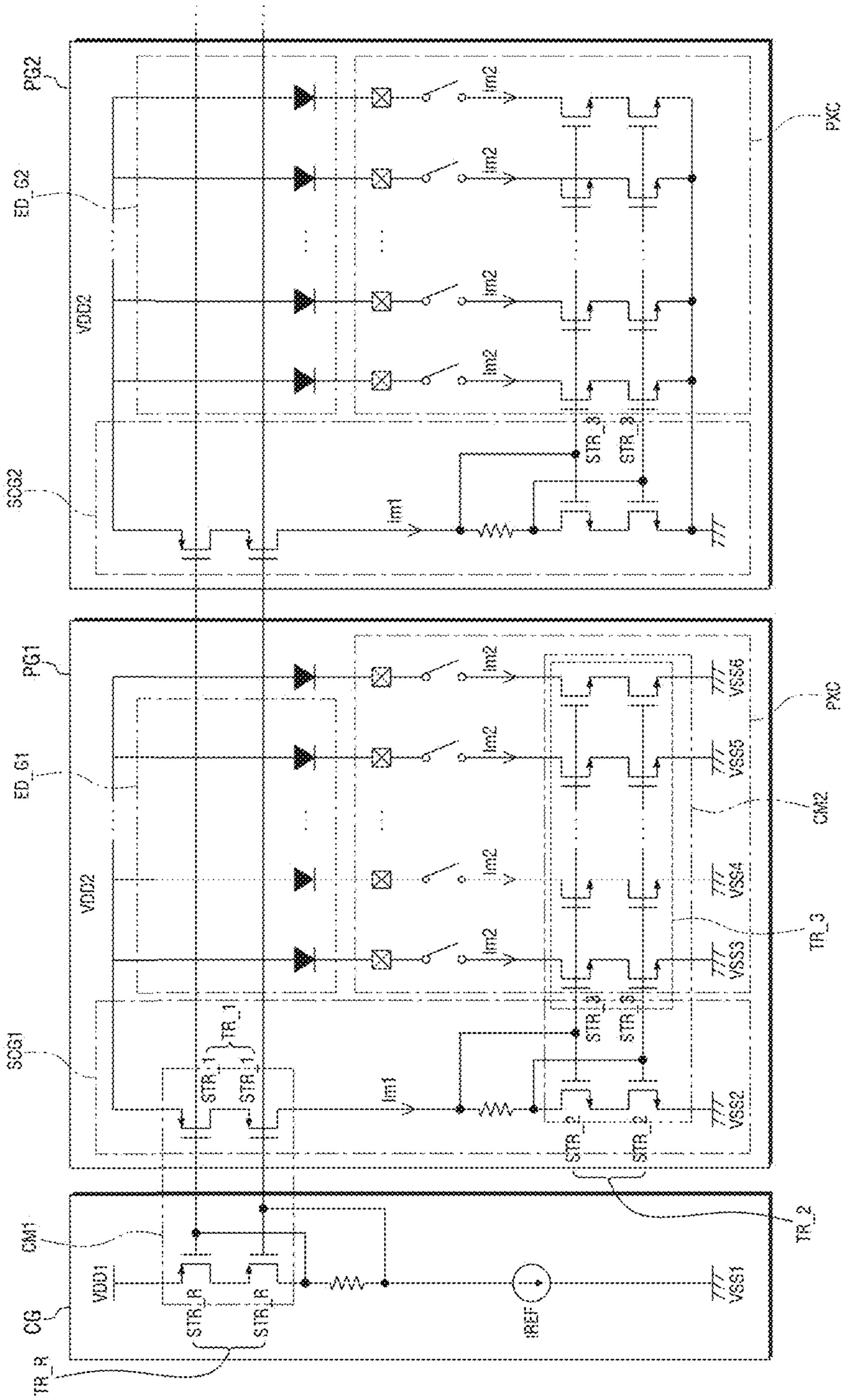
FIG. 6 is a diagram illustrating a display device according to some embodiments of the present disclosure, corresponding to the circuit diagram of FIG. 2.

FIG. 6 is a diagram illustrating a display device according to some embodiments of the present disclosure, corresponding to the circuit diagram of FIG. 2. For clarity of explanation, overlapping content with the descriptions in FIGS. 1 through 5 is simplified or omitted.

Referring to FIGS. 1, 2, and 6, each first transistor TR_1 included in the n pixel groups PG may include a plurality of first sub-transistors STR_1 connected in series. Each of the plurality of first sub-transistors STR_1 may be a PMOS transistor.

The reference transistor TR_R may include a plurality of reference sub-transistors STR_R connected in series. Each of the plurality of reference sub-transistors STR_R may be a PMOS transistor.

The plurality of reference sub-transistors STR_R and the plurality of first sub-transistors STR_1 may form the first current mirror CM1 together.

Each second transistor TR_2 included in the n pixel groups PG may include a plurality of second sub-transistors STR_2 connected in series. Each of the plurality of second sub-transistors STR_2 may be an NMOS transistor.

Each of the plurality of third transistors TR_3 included in each of the n pixel circuits PXC may include a plurality of third sub-transistors STR_3 connected in series. A single pixel may include a plurality of third sub-transistors STR_3. The plurality of third sub-transistors STR_3 included in each of the plurality of pixels may be interconnected. Each of the plurality of third sub-transistors STR_3 may be an NMOS transistor.

Each of the n pixel groups PG may include a plurality of light-emitting elements that receive the second mirrored current Im2 from the plurality of third transistors TR_3. A single light-emitting element in a pixel may receive the second mirrored current Im2 from the plurality of third sub-transistors STR_3.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A display device comprising:

a pixel array including n pixel groups;

a reference current source connected to the pixel array and configured to provide a reference current; and n sub-current sources and n pixel circuits included in corresponding ones of the n pixel groups and connected to the reference current source, wherein each of the n sub-current sources is configured to provide a first mirrored current that mirrors the reference current, wherein each of the n pixel circuits is configured to provide a second mirrored current that mirrors the first mirrored current, wherein each of the n sub-current sources is disposed within a corresponding one of the n pixel groups and is not shared with any other pixel group, wherein the reference current source comprises a reference transistor, wherein each of the n sub-current sources comprises:

a first transistor connected to the reference transistor and configured to provide the first mirrored current that mirrors the reference current; and a second transistor connected to one terminal of the first transistor and configured to provide the first mirrored current, wherein the n pixel circuits comprise a first pixel circuit, and wherein the first pixel circuit comprises a third transistor connected to the second transistor and configured to provide the second mirrored current that mirrors the first mirrored current.

2. The display device of claim 1, wherein:

each of the n pixel groups includes a plurality of light-emitting elements, and the plurality of light-emitting elements in each of the n pixel groups are connected to each of the n pixel circuits.

3. The display device of claim 2, wherein the second mirrored current is configured to be provided to each of the plurality of light-emitting elements.

4. The display device of claim 1, wherein a first pixel group of the n pixel groups comprises a light-emitting element, connected to the third transistor and configured to receive the second mirrored current.

5. The display device of claim 1, wherein:

the first transistor includes a plurality of first sub-transistors connected in series, the second transistor includes a plurality of second sub-transistors connected in series, and wherein the third transistor includes a plurality of third sub-transistors connected in series.

6. The display device of claim 5, wherein:

a first pixel group of the n pixel groups comprises a light-emitting element, connected to the third transistor and configured to receive the second mirrored current, and wherein the light-emitting element is connected to the third sub-transistors and configured to receive the second mirrored current.

7. The display device of claim 1, wherein:

the first transistor is an NMOS transistor, and the second transistor and the plurality of third transistors are PMOS transistors.

8. The display device of claim 1, wherein:
the first transistor is a PMOS transistor, and
the second transistor and the plurality of third transistors are NMOS transistors.

9. The display device of claim 1, wherein each sub-current source is configured to mirror the reference current locally within the corresponding pixel group to generate the first mirrored current, before pixel-level mirroring by any of the n pixel circuits.

10. A display device comprising:
a first pixel circuit connected to a first light-emitting element group;
a first sub-current source connected to the first pixel circuit;
a second pixel circuit connected to a second light-emitting element group;
a second sub-current source connected to the second pixel circuit; and
a reference current source connected to each of the first sub-current source and the second sub-current source and configured to provide a reference current,
wherein each of the first sub-current source and the second sub-current source is configured to provide a first mirrored current that mirrors the reference current,
wherein each of the first pixel circuit and the second pixel circuit is configured to provide a second mirrored current that mirrors the first mirrored current,
wherein the reference current source comprises a reference transistor,
wherein each of the first sub-current source and the second sub-current source comprises:
a first transistor connected to the reference transistor and configured to provide the first mirrored current that mirrors the reference current; and
a second transistor connected to one terminal of the first transistor and configured to provide the first mirrored current, and
wherein each of the first pixel circuit and the second pixel circuit comprises a third transistor connected to the second transistor and configured to provide the second mirrored current that mirrors the first mirrored current.

11. The display device of claim 10, wherein each of the first light-emitting element group and the second light-emitting element group includes a plurality of light-emitting elements.

12. The display device of claim 11, wherein the second mirrored current is configured to be provided to each of the plurality of light-emitting elements.

13. The display device of claim 10, wherein each of the first light-emitting element group and the second light-emitting element group includes a light-emitting element, connected to the third transistor and configured to receive the second mirrored current.

14. The display device of claim 10, wherein:
the first transistor includes a plurality of first sub-transistors connected in series,
the second transistor includes a plurality of second sub-transistors connected in series, and
the third transistor includes a plurality of third sub-transistors connected in series.

15. The display device of claim 14, wherein:
each of the first light-emitting element group and the second light-emitting element group includes a light-emitting element, connected to the plurality of third sub-transistors and configured to receive the second mirrored current, and
the light-emitting element is connected to the plurality of third sub-transistors and configured to receive the second mirrored current.

16. The display device of claim 10, wherein:
the first transistor is an NMOS transistor, and
the second transistor and the plurality of third transistors are PMOS transistors.

17. The display device of claim 10, wherein:
the first transistor is a PMOS transistor, and
the second transistor and the plurality of third transistors are NMOS transistors.

18. A display device comprising:
a pixel array including n pixel groups;
a reference current source connected to the pixel array and configured to provide a reference current;
n sub-current sources each disposed in a corresponding one of the n pixel groups and connected to the reference current source; and
n pixel circuits included in each of the n pixel groups and connected to the n sub-current sources,
wherein each of the n sub-current sources includes:
a first transistor that forms a first current mirror with a reference transistor of the reference current source,
wherein each of the n sub-current sources and each of the n pixel circuits includes a second current mirror connected to the first transistor, and
wherein each of the n sub-current sources is independently disposed within a corresponding one of the n pixel groups and is not shared with any other pixel group.

19. The display device of claim 18, wherein the second current mirror includes:
a second transistor connected to one terminal of the first transistor; and
a plurality of third transistors connected to the second transistor.

20. The display device of claim 19, wherein each of the n pixel groups includes a plurality of light-emitting elements, each connected to one of the plurality of third transistors.

21. The display device of claim 19, wherein:
the first transistor includes a plurality of first sub-transistors connected in series,
the second transistor includes a plurality of second sub-transistors connected in series, and
each of the plurality of third transistors includes a plurality of third sub-transistors connected in series.

22. The display device of claim 19, wherein:
the first transistor is an NMOS transistor, and
the second transistor and the plurality of third transistors are PMOS transistors.

23. The display device of claim 19, wherein:
the first transistor is a PMOS transistor, and
the second transistor and the plurality of third transistors are NMOS transistors.

24. The display device of claim 18, wherein:
the first mirrored current, mirrored from the reference current by the first current mirror, is configured to be provided to the first transistor and the second current mirror, and
the second mirrored current, mirrored from the first mirrored current by the second current mirror, is configured to be generated.

25. The display device of claim 24, wherein:
each of the n pixel groups includes a plurality of light-emitting elements, the plurality of light-emitting elements in each of the n pixel groups are connected to the second current mirror, and the second mirrored current is configured to be provided to the plurality of light-emitting elements.

* * * * *